(12) United States Patent
Lim et al.

(10) Patent No.: US 10,467,116 B2
(45) Date of Patent: Nov. 5, 2019

(54) CHECKPOINTING USING FPGA

(75) Inventors: Kevin T. Lim, La Honda, CA (US); Alvin AuYoung, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 265 days.

(21) Appl. No.: 14/396,324

(22) PCT Filed: Jun. 8, 2012

(86) PCT No.: PCT/US2012/041546
§ 371 (c)(1),
(2), (4) Date: Oct. 22, 2014

(87) PCT Pub. No.: WO2013/184125
PCT Pub. Date: Dec. 12, 2013

(65) Prior Publication Data
US 2015/0089285 A1 Mar. 26, 2015

(51) Int. Cl.
*G06F 11/00* (2006.01)
*G06F 11/30* (2006.01)
*G06F 11/14* (2006.01)

(52) U.S. Cl.
CPC ...... *G06F 11/3037* (2013.01); *G06F 11/1407* (2013.01); *G06F 11/1438* (2013.01); *G06F 11/1446* (2013.01); *G06F 2201/825* (2013.01)

(58) Field of Classification Search
CPC ............. G06F 11/3037; G06F 11/1407; G06F 11/1456
See application file for complete search history.

(56) References Cited

U.S. PATENT DOCUMENTS

| 5,175,837 | A | * | 12/1992 | Arnold | G06F 9/52 365/195 |
| 5,748,886 | A |   | 5/1998  | Kazuyoshi |  |
| 6,289,470 | B1 |  | 9/2001  | Toshiyuki |  |
| 8,127,174 | B1 |  | 2/2012  | Shah |  |
| 2006/0236152 | A1 | * | 10/2006 | Archer | G06F 11/1438 714/16 |
| 2008/0127356 | A1 | * | 5/2008 | Hsu | G06F 21/572 726/30 |

(Continued)

FOREIGN PATENT DOCUMENTS

| CN | 101256526 C | 9/2008 |
| CN | 101903866 B | 12/2010 |

(Continued)

OTHER PUBLICATIONS

Ex parte Kevin T. Lim et al., U.S. Appl. No. 13/873,459, Decision on Appeal.*

(Continued)

*Primary Examiner* — Bryce P Bonzo
*Assistant Examiner* — Jonathan D Gibson
(74) *Attorney, Agent, or Firm* — Hewlett Packard Enterprise Patent Department

(57) ABSTRACT

Methods, systems, and computer-readable and executable instructions are provided for checkpointing using a field programmable gate array (FPGA). Checkpointing using FPGA can include checkpointing data within a region of a server's contents to memory and monitoring the checkpointed data using the FPGA.

15 Claims, 3 Drawing Sheets

(56) References Cited

U.S. PATENT DOCUMENTS

2009/0070391 A1* 3/2009 Blair ................. G06F 17/30581
2009/0265504 A1* 10/2009 Klein ................. G06F 11/1438
                                                            711/100
2011/0113208 A1* 5/2011 Jouppi ................ G06F 11/1438
                                                            711/162

FOREIGN PATENT DOCUMENTS

CN           102016808 B     4/2011
WO     WO-2009067476 A2      5/2009

OTHER PUBLICATIONS

PCT Search Report/Written Opinion—Application No. PCT/US2012/041546 dated Feb. 7, 2013~10 pages.

* cited by examiner

CHECKPOINTING USING FPGA

BACKGROUND

Memcached is an in-memory key-value cache that provides caching of objects, and can be used in Web server tiers. Memcached servers provide caching of content from a data store and can be placed between a front-end web server and a back-end data store.

DETAILED DESCRIPTION

Figure 1:
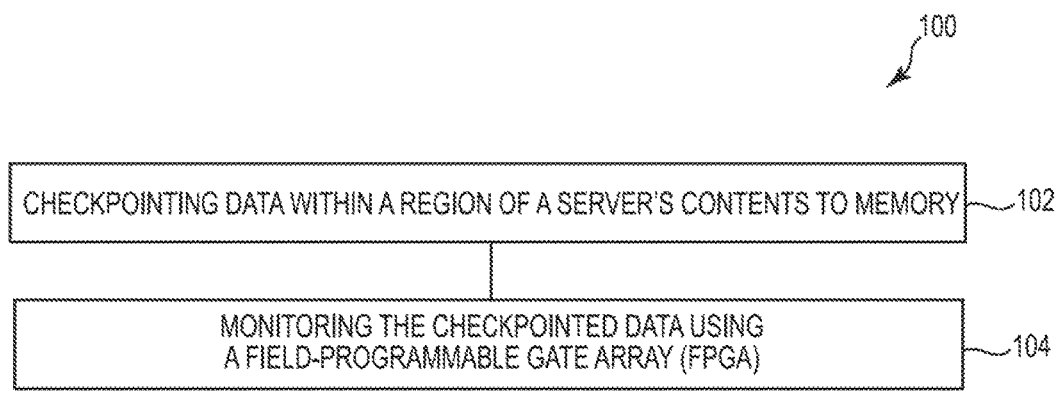
FIG. 1 is a block diagram illustrating an example of a method for checkpointing according to the present disclosure.

Memcached is an in-memory key-value cache that provides higher throughput and/or lower latency caching of objects as compared to other caching methods. Memcached servers can play a role in Web server tiers, being placed in-between a front-end web server and a back-end data store (e.g., a Structured Query Language database). These servers cache content from the data store, alleviating the need to access the back-end data store. This caching reduces the latency of object retrieval accesses for front-end servers, and also reduces the load on back-end servers.

However, caching (e.g., effective caching) content at Web-scale may require an increased amount of memory (e.g., dynamic random access memory (DRAM)) capacity as compared to other caching methods. In real-world deployments (e.g., social networking), memcached servers may have larger memory capacity per server as compared to other caching methods (e.g., over 64 GB of memory per server) and thousands of memcached servers in an entire server cluster. In these deployments, an increase in total memory (e.g., DRAM) capacity across a server pool can be met by increasing the number of servers, and/or increasing a capacity of an individual server.

To decrease management burden and a total cost of ownership of managing a number of physical servers, deployments may increase the capacity of an individual server (particularly as memory density increases) in lieu of adding additional servers. However, concerns with the amount of time required to repopulate a large cache can be an impediment to deploying memcached servers with these large memory capacities. Concerns can include temporary downtime and/or severe performance degradation (e.g., due to cache misses and induced load in the back-end database) from a memcached server crash; an increased memory capacity can increase time required for a memcached server to repopulate its cache and resume its normal operating regime.

Checkpointing data (e.g., checkpointing data using a field-programmable gate array (FPGA)), as discussed further herein, can allow for these memcached servers to increase memory capacity along with trends in memory density. For example, memcached servers can use a combination of non-volatile memory and a coherently-attached FPGA to provide faster recovery as compared to other methods, without unduly impacting performance in normal server operation.

Examples of the present disclosure may include methods, systems, and computer-readable and executable instructions and/or logic. An example method for checkpointing using an FPGA can include checkpointing data within a region of a server's contents to memory and monitoring the checkpointed data using the FPGA.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designators "N", "P," "R", and "S" particularly with respect to reference numerals in the drawings, indicate that a number of the particular feature so designated can be included with a number of examples of the present disclosure. Also, as used herein, "a number of" an element and/or feature can refer to one or more of such elements and/or features.

Checkpoints can be taken at a particular interval (e.g., an interval defined by a memcached server administrator), depending on a server's performance requirements and expectation of mean time between failures to recovery. Checkpointing can be performed by pausing an operation of the memcached server, copying all of its data to non-volatile storage (e.g., non-volatile random access memory (NVRAM)), and allowing the memcached server to resume. However, given the capacities of dynamic random access memory (DRAM) (e.g., 64 GB and/or larger) and the write bandwidth for non-volatile memory (e.g., 1 GB/s of write bandwidth), completing a full checkpoint in this manner can take a longer-than desired time (e.g., minutes rather than seconds).

FIG. 1 is a block diagram illustrating an example of a method 100 for checkpointing according to the present disclosure. At 102, data within a region of a server's contents is checkpointed to memory. In a number of embodiments, the data is checkpointed to non-volatile memory, including, among others, flash memory. Checkpointing regions of memory can provide for checkpointing with decreased disruption time over other checkpointing methods. In some examples, regions of memory can be checkpointed by region, iterating through the memory (e.g., all of the memory) until the checkpoint is taken (e.g., until the full checkpoint is taken).

An FPGA can be used to temporarily lock a memcached hash table from access, checkpoint a particular region (e.g., 2 GB, 4 GB, etc.) of the hash table (e.g., reading and copying values to memory), release the lock, and allow the overall system to resume. For example, when a particular region of memcached's state (e.g., DRAM) is checkpointed, precautions can be taken to prevent the region's contents from being changed by client requests. While a region is copied, for example, requests are "blocked" and/or "locked" from a client until the region is finished being copied. Checkpointing in such a manner, (e.g., reduced amounts at a time) can prevent disruption of normal client requests.

After a particular period of time has passed, the FPGA can relock the hash table and checkpoint a next region, continuing until the entirety of memory is checkpointed. The particular period of time between checkpointing regions can vary (e.g., nanoseconds, milliseconds, or microseconds, etc.) based on the application. The particular period of time between full checkpoints can be varied as well (e.g., seconds, minutes, hours, etc.). For example, a memcached deployment with a heavily loaded server may require more time as compared to a memcached deployment with a lesser loaded server. In some examples, the FPGA can lock the hash table for lesser periods of time, as compared to other methods, and can result in decreased disruption time compared to a single pass checkpoint method, allowing a service to remain online while checkpointing, for example.

At 104, the checkpointed data is monitored using the FPGA. The FPGA can be coherently attached and/or coupled to the memory such that any of the accesses that a main processor broadcasts to the memory is broadcast to the FPGA, allowing the FPGA to automatically track (e.g., monitor) and capture accesses within each region. In some examples, the FPGA can capture updates within each region. Through the monitoring of each region, the FPGA can maintain a consistent view of each checkpoint and the overall checkpoint. In a number of examples, the FPGA is located in a separate network socket (e.g. a different endpoint of an inter-process communication flow across a computer network) than the memory.

The coherently attached FPGA can observe traffic to the regions by invalidating cache lines associated with a region that is checkpointing. The FPGA can snoop on those cache lines. If the non-volatile memory is not byte addressable (e.g., flash memory), updates captured can be buffered and written to a log, for example. This log can be replayed against a completed checkpoint, allowing a consistent state to be maintained.

If enough updates (e.g., a particular number) happen to a single block, the entire block can be re-written to the non-volatile memory. In some embodiments, a block (e.g., unit) can include a granularity with which the FPGA writes information to its own local memory. For example, if enough updates (e.g., log updates) fill up a block, the FPGA can write that block to non-volatile memory (e.g., NVRAM). In some examples, enough updates can include enough writes that an entire block can be programmed to that of logging each operation. Once the checkpoint is completed, the FPGA can stop snooping the address regions associated with the checkpoint.

If the checkpoint needs to be restored, a system call can be implemented that can allow a memcached process to request that data be transferred from the FPGA's storage to main memory. Bookkeeping state(s) can be saved (e.g., to memory) and provided, including, among others, pointers to a start of a checkpoint region, a size of a checkpoint, and/or an address for a beginning of a memcached hash table. In some examples, the checkpointed data can be utilized to recover the server in response to the server crashing. In some examples, the memory attached to the FPGA is used only for checkpointing, and the FPGA is used to accelerate the checkpointing.

In some embodiments, monitoring the checkpointed data can include excluding expired data entries from the checkpointing regions. Systems such as memcached can use a lazy eviction of expired entries. For example, items that are older than their expiration time are not evicted immediately, but are instead evicted upon next access. In the present disclosure, to reduce the amount of information being written to memory (e.g., non-volatile memory), the FPGA can do a check of the data being read from the region and exclude any entries that are past their expiration time (e.g., using an integer comparison). This can reduce lifetime wear-out due to writes and can reduce bandwidth consumed.

To reduce and/or further reduce data that is written, compression can be applied to the data that is being checkpointed (e.g., encoding information using fewer bits than an original representation). The FPGA can read and buffer a particular amount of memcached state, which it can compress prior to writing to memory. For example, rather than having the FPGA copy contents of memcached's DRAM state into non volatile memory (e.g., NVRAM), the FPGA can copy the contents into its own internal buffer, compress the contents, and copy the compressed contents into the non volatile memory. In some examples, by staging the contents on its own memory, the FPGA may be able to reduce an amount of time in which the memcached DRAM contents (e.g., from client requests) are locked. When restoring the checkpoint, the data can be decompressed. A choice to compress (e.g., choice of a compression model), can provide a server administrator options to trade-off memory checkpoint capacity and speed. Logged updates can be replayed at the time of checkpoint restoration, as opposed to final checkpoint saving, for example.

Service disruption can be reduced by dividing a hash table lock and adding an additional lock or locks into the region. As a result, accesses that occur to a region or regions that are not being checkpointed at the time can be allowed to proceed, reducing overall service disruption. The FPGA may have access to a memcached hash table lock within one of the number of regions, for instance.

In some examples, the FPGA can receive information regarding a hash table of each of the number of regions and data within each of the number of regions. The FPGA may have access to a memcached hash table lock within one of the number of regions, for example.

In some embodiments, the FPGA tracks updates to regions that have already been checkpointed. To reduce the amount of updates, state changes during checkpointing can be temporarily reduced. For example, while a checkpoint is being taken, a server can avoid updating cache policy bookkeeping (e.g., a least recently used list). Doing so may not impact correctness and can reduce the number of writes to memory and the number of updates the FPGA tracks.

Figure 2:
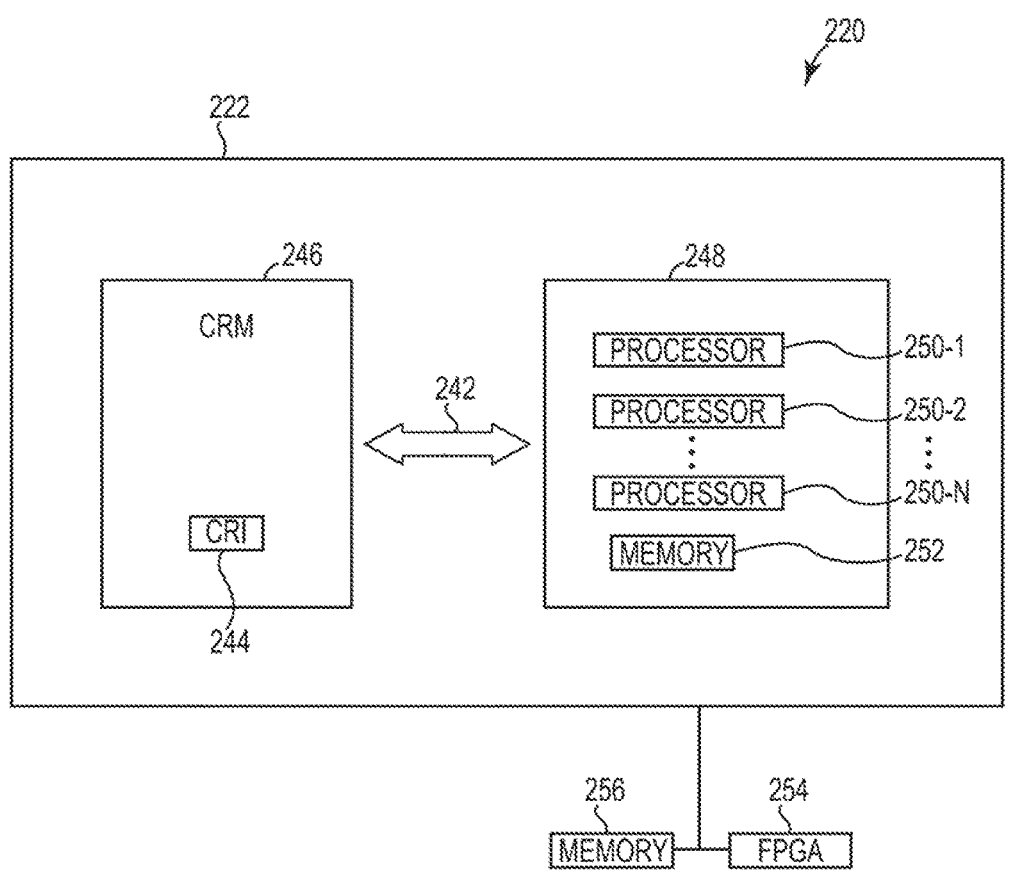
FIG. 2 illustrates a block diagram of an example system for checkpointing according to the present disclosure.

FIG. 2 illustrates a block diagram of an example system 220 for checkpointing according to the present disclosure. System 220 can include FPGA 254 and memory (e.g., non-volatile memory) 256. FPGA 254 can be coherently attached and/or coupled to memory 256, meaning, for example, that an access that a main processor broadcasts to memory 256 can be broadcast to FPGA 254, allowing FPGA 254 to automatically track (e.g., monitor) and capture accesses within each checkpointed region.

System 220 can include a computing device 222 having a memory and processing resources with instructions (e.g., computer-readable instructions (CRI) 244) stored in the memory and executed by the processing resources to checkpoint data. As described herein, the computing device 222 can be any combination of hardware and/or program instructions (e.g., CRI) configured to checkpoint. The hardware, for example, can include one or more processing resources 250-1, 250-2 . . . 250-N, computer-readable medium (CRM) 246, etc. The program instructions can include instructions stored on the CRM 246 that are executable by the one or more processing resources to implement one or more of the various functions, or specific acts described herein (e.g. checkpoint data).

The computing device 222 can include the CRM 246 in communication with the processing resources 250-1, 250-2 . . . 250-N. CRM 246 can be in communication with a computing device 248 (e.g., a Java® application server, among others) having processing resources of more or fewer than 250-1, 250-2 . . . 250-N, The computing device 248 can be in communication with a tangible non-transitory CRM 246 storing a set of computer-readable instructions (CRI) 244 executable by one or more of the processing resources 250-1, 250-2 . . . 250-N, as described herein. The CRI 244 can also be stored in remote memory managed by a server and represent an installation package that can be downloaded, installed, and executed. The computing device 248 can include memory resources 252, and the processing resources 250-1, 250-2 . . . 250-N can be coupled to the memory resources 252.

Processing resources 250-1, 250-2 . . . 250-N can execute CRI 244 that can be stored on an internal or external non-transitory CRM 246. The processing resources 250-1, 250-2 . . . 250-N can execute CRI 244 to perform various functions, including the functions described in the method 100. For example, the processing resources 250-1, 250-2 . . . 250-N can execute CRI 244 to checkpoint data. A non-transitory CRM (e.g., CRM 246), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 246 can be integral, or communicatively coupled, to the computing device 248, in a wired and/or a wireless manner. For example, the non-transitory CRM 246 can be an internal memory, a portable memory, a portable disk, or a memory associated with another computing resource.

The CRM 246 can be in communication with the processing resources 250-1, 250-2 . . . 250-N via a communication path 242. The communication path 242 can be local or remote to a machine (e.g., a computing device 248) associated with the processing resources 250-1, 250-2 . . . 250-N. Examples of a local communication path 242 can include an electronic bus internal to a machine (e.g., a computer) where the CRM 246 is one of volatile, non-volatile, fixed, and/or removable storage medium in communication with the processing resources 250-1, 250-2 . . . 250-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 242 can be such that the CRM 246 is remote from the processing resources e.g., 250-1, 250-2 . . . 250-N, such as in a network connection between the CRM 246 and the processing resources (e.g., 250-1, 250-2 . . . 250-N). That is, the communication path 242 can be a network connection. Examples of such a network connection can include a local area network (LAN), wide area network (WAN), personal area network (PAN), and the Internet, among others. In such examples, the CRM 246 can be associated with a first computing device and the processing resources 250-1, 250-2 . . . 250-N can be associated with a second computing device (e.g., computing device 248). For example, a processing resource 250-1, 250-2 . . . 250-N can be in communication with a CRM 246, wherein the CRM 246 includes a set of instructions and wherein the processing resource 250-1, 250-2 . . . 250-N is designed to carry out the set of instructions to checkpoint data.

The processing resource 250-1, 250-2 . . . 250-N coupled to the memory 252 can execute program instructions to checkpoint data. The processing resource 250-1, 250-2 . . . 250-N coupled to the memory 252 can execute program instructions to receive, to an FPGA, a number of address regions within a memcached server to checkpoint. In various examples of the present disclosure, the processing resource 250-1, 250-2 . . . 250-N coupled to the memory 252 can execute program instructions to periodically checkpoint each of the number of address regions to non-volatile memory, and in some examples of the present disclosure, the processing resource 250-1, 250-2 . . . 250-N coupled to the memory 252 can execute program instructions to automatically monitor data within each of the number of address regions using the FPGA.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing.

Figure 3:
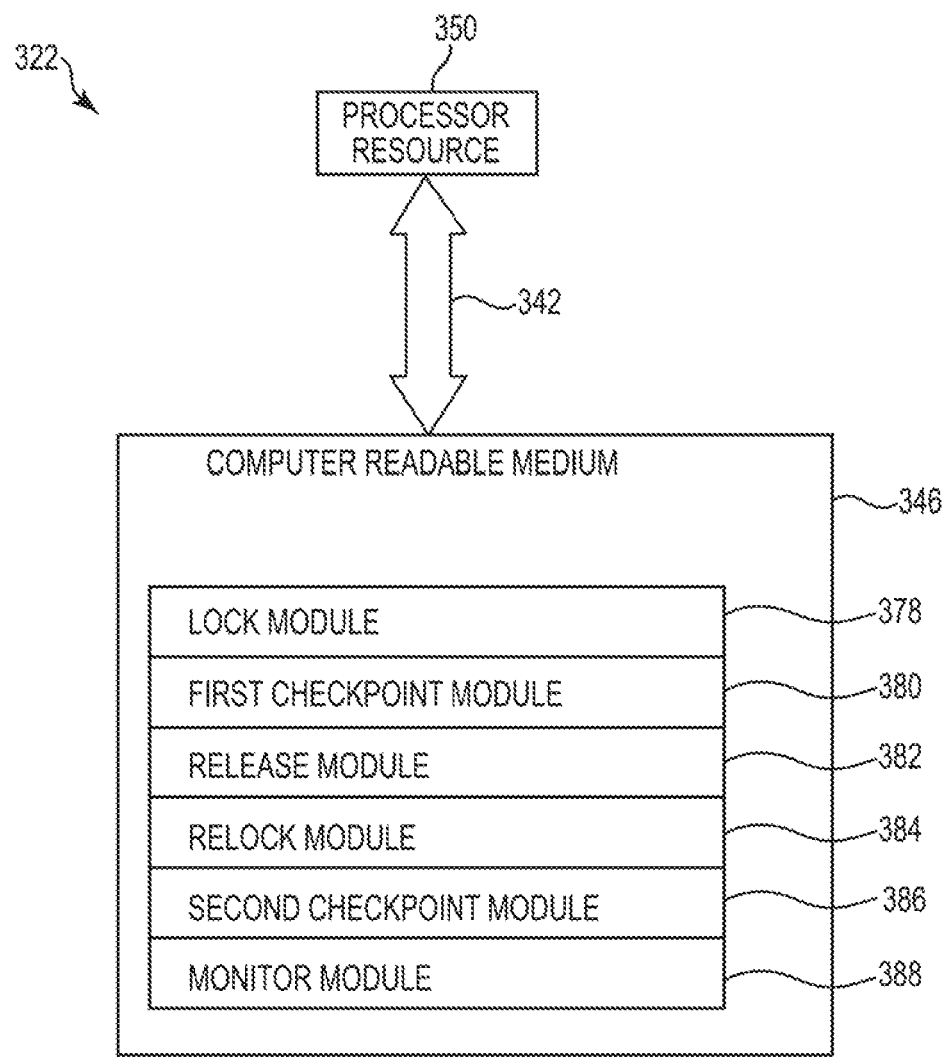
FIG. 3 is a block diagram illustrating a processing resource, a memory resource, and computer-readable medium according to the present disclosure.

FIG. 3 illustrates a diagram of an example computing system 322 for balancing management duties in a cloud system according to the present disclosure. The computing system 322 can comprise a processing resource 350. The processing resource 350 can, for example, include the processing resources 250-1, 250-2 . . . 250-N described in FIG. 2.

The processing resource 350 can be communicatively coupled to a CRM 346 via a communication path 342. The CRM 346 can be similar to CRM 246 described in FIG. 2. The CRM 346 can include a number of modules 378, 380, 382, 384, 386, and 388. The number of modules can include CRI that can be executed, for example, by the processing resource 350 to perform a number of functions.

A lock module 378 can, for example, include a number of CRI executable by the processing resource 350 to perform or achieve the particular act or carry out the act of temporarily locking a memcached hash table from access using an FPGA.

A first checkpoint module 380 can include a number of instructions that can be executed by the processing resource 350. For example, the first checkpoint module 380 can checkpoint a first region of a memcached server's contents to non-volatile memory while the memcached hash table is locked.

A release module 382 can include a number instructions that can be executed by the processing resource 350. For example, the release module 382 can release the lock for a period of time, and a relock module 384 (e.g., including a number of instructions that can be executed by the processing resource 350) can relock the memcached hash table. In a number of embodiments, lock module 378 can relock the memcached hash table. Lock module 378 and relock module 384 can include, for example, the same module. For example, in some embodiments, computing system 322 does not include a relock module.

A second checkpoint module 386 can include a number of instructions that can be executed by the processing resource 350. For example, the second checkpoint module 386 can checkpoint a second region of the memcached servers contents to the non-volatile memory while the memcached hash table is relocked. In a number of embodiments, first checkpoint module 380 and second checkpoint module 386 include the same module.

A monitor module 388 can, for example, include a number of instructions that can be executed by the processing resource 350. For example, monitor module 388 can monitor the checkpointed data within the first and second regions using the FPGA, wherein the FPGA is coherently attached to the non-volatile memory.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A computer-implemented method for checkpointing using a field programmable gate array (FPGA) comprising:
   temporarily locking a first region of data of a server to prevent access to the data in the first region while allowing access to data in other regions of the server;
   checkpointing the data in the first region of the server to memory while the first region is locked;
   subsequent to checkpointing the data in the first region, releasing the locking of the first region; and
   monitoring the checkpointed data of the first region using the FPGA, wherein the FPGA is coherently coupled to the memory such that the monitoring is performed automatically with the FPGA capturing accesses within the first region and the FPGA invalidates cache lines associated with the data in the first region of the server when it is checkpointing.

2. The method of claim 1, wherein accesses to the memory are broadcast to the FPGA.

3. The method of claim 1, wherein checkpointing the data to the memory further comprises checkpointing the data to non-volatile memory.

4. The method of claim 1, further comprising utilizing the checkpointed data to recover the server in response to the server crashing.

5. The method of claim 1, further comprising compressing the data in the first region before checkpointing the data to the memory.

6. The method of claim 1, wherein monitoring the data further comprises excluding expired data entries from the first region.

7. A non-transitory computer-readable medium storing a set of instructions executable by a processing resource to:
   temporarily lock a first region of data in a memcached server using a field-programmable gate array (FPGA) to prevent access to the data in the first region while allowing access to other regions of data in the memcached server;
   checkpoint the first region of data of the memcached server to non-volatile memory while the first region of the memcached server is locked;
   release the lock for a period of time;
   lock a second region of data of the memcached server;
   checkpoint the second region of data of the memcached server to the non-volatile memory while the second region of the memcached server is locked; and
   monitor the checkpointed data within the first and second regions using the FPGA, wherein the FPGA is coherently attached to the non-volatile memory such that the monitoring is performed automatically with the FPGA capturing accesses within the first and second regions and the FPGA invalidates cache lines associated with the first and second regions of data when they are checkpointing.

8. The non-transitory computer-readable medium of claim 7, wherein the instructions are further executable to monitor the data by tracking an update to each of the first and second regions.

9. The non-transitory computer-readable medium of claim 7, wherein the memcached server includes a memcached hash table, and wherein the instructions are further executable to divide the memcached hash table into regions for locking and releasing the lock.

10. The non-transitory computer-readable medium of claim 7, wherein the instructions are further executable to temporarily reduce region updates during checkpointing.

11. The non-transitory computer-readable medium of claim 7, wherein the instructions are further executable to receive, at the FPGA, information about a hash table of the first and second regions and data within each of the first and second regions.

12. A system for checkpointing using a field-programmable gate array (FPGA), comprising:
   a memory resource; and
   a processing resource coupled to the memory resource, to:
      receive a number of address regions within a memcached server to checkpoint;
      temporarily lock a first address region to prevent access data in the first address region while allowing access data in other address regions of the memcached server;
      checkpoint the first address region to non-volatile memory while the first address region is locked; and
      monitor the data in the first address region using the FPGA, wherein the FPGA is coherently coupled to the non-volatile memory such that the monitoring is performed automatically with the FPGA capturing accesses within the first address region and the FPGA invalidates cache lines associated with the first address region when it is checkpointing.

13. The system of claim 12, wherein the processing resource is further coupled to the memory resource to allow the FPGA access to a memcached hash table lock within one of the number of address regions.

14. The system of claim 12, wherein the processing resource is further coupled to the memory resource to save to the non-volatile memory at least one of a pointer to a start of one of the number of address regions, a size of an address region checkpoint, and an address for a beginning of a memcached hash table.

15. The system of claim 12, wherein the FPGA is located in a separate network socket from the non-volatile memory.

* * * * *